Patented June 3, 1930

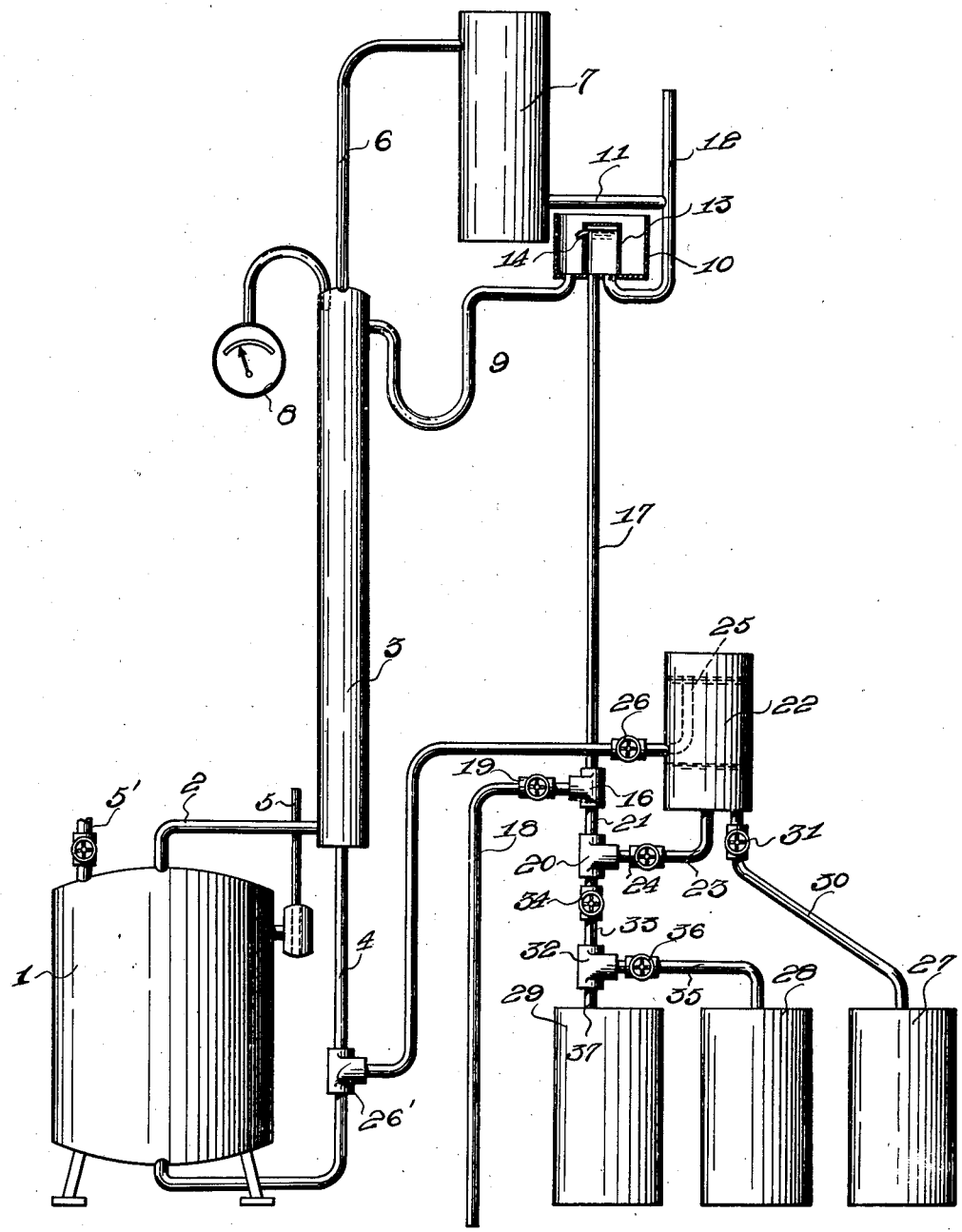

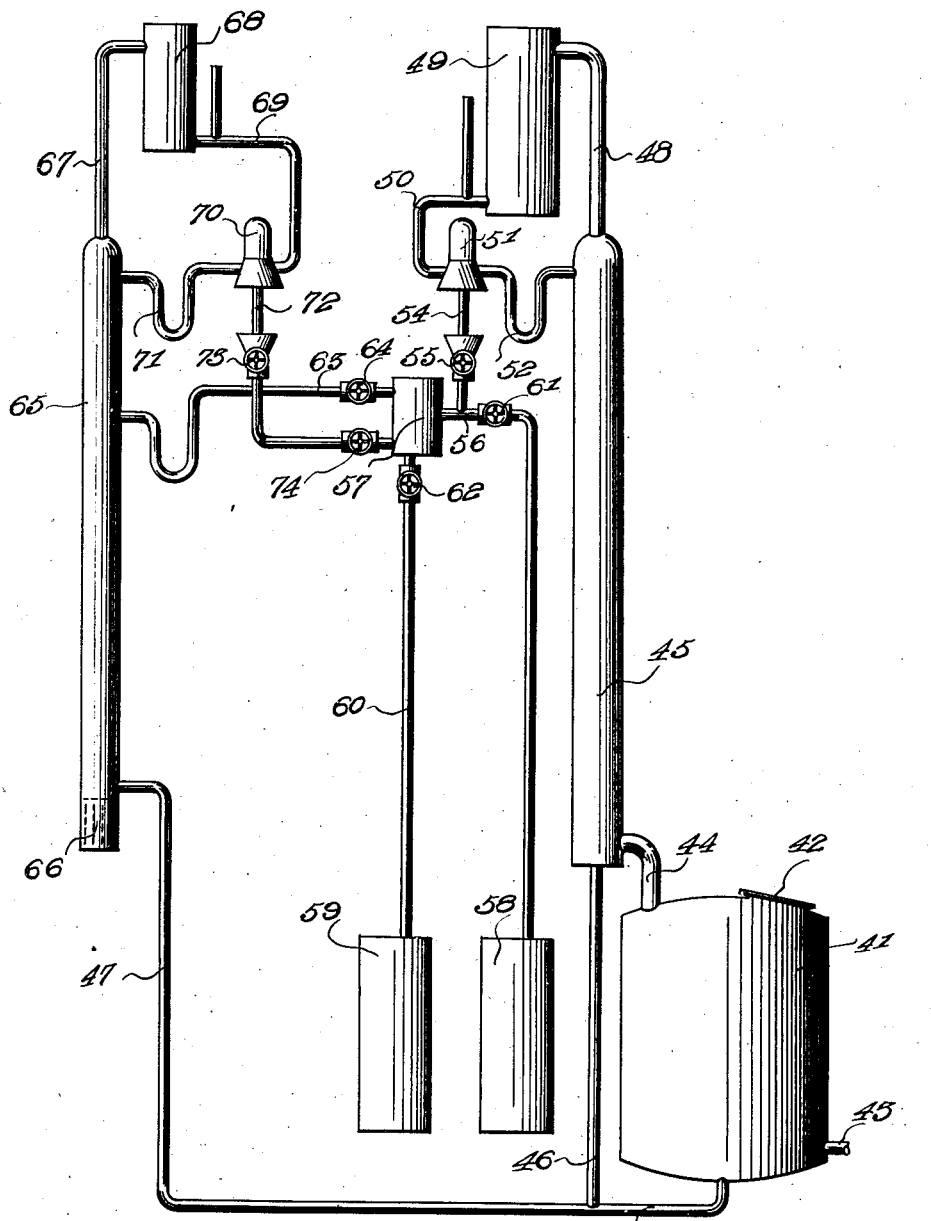

1,761,779

UNITED STATES PATENT OFFICE

RUSSELL B. CROWELL, OF AGNEW, CALIFORNIA. ASSIGNOR TO AMERICAN SOLVENTS & CHEMICAL CORPORATION, OF NEW YORK, N. Y., A CORPORATION OF MARYLAND

PROCESS FOR MANUFACTURING ABSOLUTE ALCOHOL

Application filed December 9, 1926. Serial No. 153,550.

The present invention relates to improved processes for the manufacture of absolute or anhydrous alcohol from aqueous alcohol.

More particularly the invention relates to improved discontinuous processes for the commercial production of absolute or anhydrous ethyl alcohol from aqueous alcohol based upon the well known physico-chemical phenomena of minimum boiling point mixtures. It has been long known that a mixture of alcohol, water, and low boiling substances miscible with alcohol and immiscible with water, such as benzene, chloroform, carbon tetrachloride, carbon bisulphide, ethyl acetate and the like, pass over on distillation in the form of a ternary mixture of constant proportions and at a boiling point less than that of any of the components of the mixture; and a mixture of alcohol and the substances mentioned will pass over on distillation as a binary mixture at temperatures above the boiling point of the ternary mixture of alcohol, water and the substance, but below that of alcohol. For example, benzene or benzol forms with alcohol and water a ternary mixture boiling at approximately 64.9 degrees centigrade and containing approximately 74.3 per cent benzol, 7.5 per cent water, and 18.2 per cent alcohol, benzol or benzene also forms with alcohol a binary mixture boiling at 68.2 degrees centigrade and containing approximately 67.6 per cent benzol and 32.4 per cent alcohol. Alcohol forms with water a binary mixture which boils at approximately 78.15 degrees centigrade. These phenomena have long been utilized for the production of anhydrous or absolute alcohol. In prior processes it has been the practice to add benzene to the aqueous alcohol from which anhydrous alcohol is to be produced in excess of the amount required to form a ternary mixture with alcohol and all of the water present as the ratio of benzene to water in the ternary mixture is 9.5 to 1 to 10 to 1. Prior processes require amounts of benzene varying from 9.5 to 1 to amounts in excess of 16 to 1. The use of a large excess of benzene requires the handling of relatively large quantities of the binary mixture of benzene and alcohol with the attendant increased costs. In no case has a process heretofore been proposed, so far as I am aware, in which substantially less benzene or equivalent substance is initially added to the aqueous alcohol than is theoretically required to form a ternary mixture with alcohol and the water present.

I have discovered that by utilizing benzene or an equivalent substance in an amount not exceeding, and preferably less than that required to form the ternary mixture with the alcohol and water in the production of anhydrous alcohol from aqueous alcohol, the distillation process can be carried on with greater efficiency and a substantially higher yield of anhydrous alcohol is secured from a given quantity of aqueous alcohol as compared to the yields of prior methods. In practice, my improved process is carried out by adding to a still containing the aqueous alcohol to be treated, benezene free from impurities such as xylol, toluol and the higher hydrocarbons, or an equivalent substance, in an amount sufficient to form enough ternary mixture with water and alcohol to insure steady operation of the apparatus, but preferably substantially less than the amount necessary to form a ternary mixture with the water present, and as the distillation proceeds, sufficient benzene or equivalent substance is added to maintain steady distillation of the ternary mixture until all of the water is removed. The aqueous alcohol to be treated usually contains 5 per cent water, and in actual factory practice benezene in an amount 3.5 times the weight of water present has given excellent results. I have found for most efficient operation that a ratio by weight of benzene to water not exceeding 9.5 to 1, and preferably of from 3 to 1 to 4 to 1 should be utilized. Accordingly, the primary object of my invention is to provide an improved process for the production of anhydrous alcohol from aqueous alcohol by utilizing the phenomena of minimum boiling point or azeotropic mixtures in which the benzene or equivalent substance introduced to form the minimum boiling point mixtures is utilized in quantities substantially less than that theoretically required to form a ternary mixture with the water present, alcohol, and the substance utilized.

Another object of the invention is to provide processes for the production of anhydrous alcohol from aqueous alcohol in which maximum yields and efficiency are secured in both small and large scale operations.

Further objects of the invention will appear in the following detailed description of the preferred embodiments thereof, and are such as may be attained by a utilization of the various combinations, sub-combinations, steps, and principles more fully hereinafter set forth and as defined by the scope of the appended claims.

Referring to the drawings—

Figure 1 shows more or less diagrammatically one arrangement of apparatus for carrying out my improved process. This arrangement is especially adapted to small scale operation.

Figure 2 shows diagrammatically a modified and improved form of apparatus for carrying out my process; especially adapted to large scale operation.

As shown in Figure 1, 1 designates a still pot for the reception therein of a mixture of aqueous ethyl alcohol and benzene, heated in any suitable manner. Leading from the top of still 1 is a pipe 2 that leads in to the bottom of a fractionating column 3. Leading from the bottom of the column 3 and terminating in the bottom of still 1 is a pipe 4. A pressure gauge 5 and a valved charging pipe 5' are provided for the still.

Leading from the top of column 3 is a vapor pipe 6 terminating in the side of a condenser 7, and connected in the top of column 3 is a temperature recording instrument 8. Connected to the side of column 3 at a point near its top is a reflux pipe 9 which at its other end terminates in the bottom of a tail box 10. A connecting pipe 11 is provided from condenser 7 to the pipe 12 which is open at its upper end and connected at its lower end to tubular extension 13 of tail box 10. Provided in the top of tubular extension 13 is an opening 14 for the overflow or reflux liquid which passes from tail box 10 through pipe 9 back to the top of column 3. Leading from the bottom of the tubular extension 13 and terminating in a T-connection 16 is a pipe 17. Extending from the lateral branch of connection 16 is a pipe 18 having a valve 19 therein and extending from the bottom of connection 16 and connected to T connection 20 is a nipple 21. Connected to the lateral branch of connection 20 and terminating in the bottom of decanter 22 is a pipe 23 in which valve 24 is connected. Extending into and terminating near the top of decanter 22 is a pipe 25 in which valve 26 is connected. The lower end of pipe 25 is connected to pipe 4 through T connection 26'.

Mounted adjacent and preferably disposed below decanter 22 are tanks 27, 28 and 29 respectively. A pipe 30 provided with valve 31 connects the bottom of decanter 22 to tank 27. Extending from T connection 20 and terminating in a T connection 32 is a pipe 33 having a valve 34 disposed therein. Tank 28 is connected to the lateral branch of T 32 through pipe 35 and valve 36 and tank 29 is connected to T 32 by the pipe connection 37.

In practicing my invention with the apparatus shown in Figure 1, the aqueous alcohol to be dehydrated usually contains about 95% alcohol, and about 5% of water and is mixed with a weight of benzine not exceeding 9.5 times, and preferably equal to 3.5 to 5 times the weight of water to be removed and a suitable charge of this mixture is placed in still or pot 1. The mixture in the still is heated to distill a ternary mixture of alcohol, water, and benzine at 64.9° C., and the vapors are fractionated in column 3. The ternary mixture passes through pipe 6 into condenser 7, is condensed and passes downward in liquid form through pipes 11 and 12 into tail box or sight glass 10. In tail box 10 the condensate divides, part being passed back to the upper part of column 3 as reflux through opening 14 in section 13 of the tail box and through pipe 9 which is bent to form a liquid seal between the column and the tail box. The refluxed portion passes downward through the column and back into still 1 through pipe 4. The remainder of the condensate in tail box 10 passes downward through pipe 17, valve 24 and pipe 23 into decanter 22. In decanter 22 the condensed ternary mixture separates into an upper layer of approximately 85% and a lower layer of approximately 15%. The upper layer or fraction ordinarily termed the benzene layer contains approximately 76% benzene, 21% alcohol and 3% water, and the lower layer, commonly termed the water layer, contains approximately 53% alcohol, 20% benzene, and 27% water. During the distillation of the ternary mixture the benzene layer accumulates in the decanter until it reaches the open end of decanting pipe 25 through which it is passed by means of open valve 26, pipes 25 and 4, back into pot 1. As the water layer accumulates it is drained through valve 31 and pipe 30 to receiving tank 27, and when sufficient quantities have accumulated, it is scrubbed with water or treated in any other well known manner to recover the benzene.

When the water layer no longer separates in the decanter 22, this is taken as an indication that the water has all been removed from the batch. A binary mixture of alcohol and benzene will then distill over, as set forth for the ternary mixture, at a temperature of 68.2° C. Any condensed binary mixture accumulated in decanter 22 may be drained into tank 28 or 29 through valve 24, open valves 34 and 36, and pipes 33 and 35. Valve 24 is then closed and the condensed binary mixture passes into storage in tanks 28 and 29. After all traces of benzene are removed from the batch, pure or anhydrous alcohol distills over at a temperature of 78.4° C. Valve 34 is then closed and valve 19 is opened. The condensed anhydrous alcohol then passes through pipe 18 to storage. Distillation of the anhydrous alcohol may continue in this stage to obtain a product free of dirt, or sludge, and to avoid the necessity of pumping the residue of pure alcohol to storage. It will be obvious, however, that in place of continuing this distillation, the residue might be pumped to a storage tank through suitable mechanical filters.

The binary mixture of benzene and alcohol accumulated in tanks 28 and 29 is mixed with the succeeding batch, and as above set forth, the benzene is recovered from the water layer in tank 27 and reused.

By observing the temperatures at the top of column 3 by thermometer 8, the end of each stage of the distillation may be accurately noted. The reflux so important in efficient distillation, is easily controlled by means of sight glass 10 and indicating valve 24. Valve 24 need only be set once for each stage of the distillation. The amount of heat supplied to the pot is governed by the pressure and rate of flow required, and distillation may be carried out by operatives of ordinary intelligence and skill without the use of more than usual care.

In the form of invention shown in Figure 2, the still pot 41 is provided with a charging cover 42 and a discharge or drain outlet 43. The still is provided with suitable heating means, such for example as a heating steam coil jacket or the like. The top of the still pot 41 is connected by the vapor pipe 44 to a fractionating column 45 of any suitable type. Column 45 is connected at its bottom through pipes 46 and 47 to the bottom of the still 41, and the upper end of the column is connected through vapor passage 48 to the top of condenser 49 which may be of any suitable type. The liquid outlet of condenser 49 is connected through pipe 50 to tail box or sight glass 51. A reflux connection 52 is provided between tail box 51 and the top of column 45 through which part of the liquid collecting in the tail box passes back to the top of column 45 as a reflux. The remainder of the liquid in the tail box passes downward through the pipe 54 and control valve 55, through the pipe 56. The upper end of pipe 56 connects with separator or decanter 57 and the lower end is connected to storage tank 58. The bottom of separator 57 is connected to a storage tank 59 through the pipe 60, and control valves 61 and 62 are provided in the pipes 56 and 60 respectively. Near its top separator 57 is connected to one end of pipe 63 in which the control valve 64 is disposed, and at the other end pipe 63 is connected to continuous column 65. Column 65 is heated through a steam coil or tube sheet 66 disposed at the bottom thereof. At its top the column 65 is connected by vapor pipe 67 to the top of condenser 68. The liquid outlet of the condenser 68 is connected through pipe 69 to sight glass or tail box 70, and a reflux pipe connection 71 is provided to return part of the liquid collected in tail box 70 to the top of the column 65 as reflux. The remainder of the liquid collected in the tail box 70 passes downward through pipe 72 and control valves 73 and 74 to the bottom of the separator 57. The bottom of the column 65 is connected to the bottom of the still 41 through the pipe 47.

In operation of this form of invention, aqueous ethyl alcohol together with benzene or equivalent substance, preferably in an amount substantially less than that required to form a ternary mixture with alcohol and all of the water present in the alcohol is placed in the still 41. Heat is applied to the still at a proper rate to efficiently separate a ternary mixture of alcohol, water and benzol or the substance. The vapors from the still, consisting primarily of the ternary mixture pass upward through pipe 44, column 45, and vapor pipe 48 into condenser 49. In condenser 49 the vapors are condensed to a liquid which passes downward through pipe 50 into sight glass 51 where it divides, part returning through pipe 52 as reflux to the top of the column 45, and the remainder passing downward through pipe 54, valve 55, pipe 56 and into separator or decanter 57, valve 61 being closed. In decanter 57 the ternary mixture separates into two layers, the top or benzene layer comprising approximately 85 per cent of the total and containing approximately 76 per cent benzene, 3 per cent water and 21 per cent alcohol, and the lower or water layer comprising about 15 per cent of the total and containing approximately 20 per cent benzol, 27 per cent water and 53 per cent alcohol. The top layer as it collects passes through the pipe 63 and open valve 64 into and downward through column 65. The heating of column 65 is so regulated that the water contained in the benzene layer is distilled in the form of a ternary mixture of alcohol, water and benzene. This ternary mixture passes upward through the vapor pipe 67 leaving a mixture of benzene and alcohol free from water which continuously passes out of the bottom of column 65 through pipe 47 into the bottom of the still 41, maintaining a sufficient proportion of benzene in the still throughout the distillation to maintain a continuous distillation of ternary mixture so long as water is present in the still.

The ternary mixture distilled in the column 65 passes upward through the vapor pipe 67 into condenser 68 where it is condensed to liquid form and passes through pipe connection 69 into the sight glass or tail box 70. In tail box 70 the liquid divides, part passing through pipe 71 as reflux to the column 65 and the remainder passing down through the pipe 72, valve 73 and valve 74 into the separator 57 mixing with the ternary mixture from the sight glass or tail box 51, and separating into benzene and water layers as above set forth.

The lower or water layer which accumulates in the separator 57 is periodically withdrawn therefrom by opening the valve 62 and permitting it to discharge by gravity to pipe 60 into storage receptacle 59.

The operations are continued as described until substantially all of the water has been removed from the mixture in the still 41, at which time the quantities of ternary mixture evolved are insufficient to form two layers in separator 57. Column 65 is now closed down and valves 64 and 74 are then closed and the valve 61 is opened and distillation is conducted to remove the remaining benzene in the still 41, primarily as a binary mixture which passes into the container 58 for storage. When all of the benzol is removed from the still 41 the operation is completed and the residue contained in the still is anhydrous alcohol. This anhydrous alcohol is withdrawn through pipe 43 and passed through suitable filters to free it from contamination due to the presence of dirt, sludge, and the like.

The content of the tank 58 is mixed with a succeeding batch in the still 41, and the mixture stored in the tank 59 is treated in any suitable manner to recover the benzol contained therein which is also mixed with a succeeding batch.

This application is a continuation in part of application Serial No. 6,727, filed February 4, 1925, process for manufacturing absolute alcohol.

It will be apparent to those skilled in the art that improved processes for the production of anhydrous alcohol from aqueous alcohol have been provided in which wide variations may be made without departing from the spirit of my invention.

Accordingly, what is desired to be secured by Letters Patent and claimed as new is:

1. In a batch process of manufacturing anhydrous alcohol from aqueous alcohol, the step of forming a mixture of aqueous alcohol and a liquid substance capable of forming an azeotropic ternary mixture of minimum with alcohol and water, the said substance being present in an amount not exceeding that required to form said ternary mixture, distilling said mixture to separate an azeotropic mixture of alcohol, water and said substance therefrom and maintaining sufficient said third substance in the batch mixture during the distillation to completely dehydrate the alcohol.

2. In a batch process of manufacturing anhydrous alcohol from aqueous alcohol, the step of forming a batch mixture of aqueous alcohol and benzene, the benzene being present in an amount not exceeding that required to form the azeotropic mixture with alcohol and water, distilling the said mixture to separate an azeotropic ternary mixture of alcohol, water and benzene therefrom, and maintaining sufficient benzene in the batch mixture during the distillation to completely detydrate the alcohol.

3. In a batch process of manufacturing anhydrous alcohol from aqueous alcohol, the step of forming a mixture of aqueous alcohol and benzene, the benzene being present in an amount not exceeding 9.5 times the weight of the water present, distilling the said mixture to separate an azeotropic ternary mixture of alcohol, water and benzene therefrom, and maintaining sufficient benzene in the batch mixture during the distillation to completely dehydrate the alcohol.

4. In a batch process of manufacturing anhydrous alcohol from aqueous alcohol, the step of forming a mixture of aqueous alcohol and benzene, the benzene being present in an amount equal to 3.5 to 5 times the weight of water present, distilling the said mixture to separate an azeotropic ternary mixture of alcohol, water and benzene therefrom, and maintaining sufficient benzene in the batch mixture during the distillation to completely dehydrate the alcohol.

5. In a batch process of manufacturing anhydrous alcohol from aqueous alcohol, the step of forming a mixture of aqueous alcohol and a liquid substance capable of forming an azeotropic ternary mixture of minimum boiling point with alcohol and water, the said substance being present in an amount not exceeding that required to form said ternary mixture, and distilling said mixture to separate an azeotropic mixture of alcohol, water and said substance therefrom, condensing said azeotropic ternary mixture and allowing it to separate into two layers, and returning the layer richer in third substance to said first named mixture as the distillation thereof proceeds.

6. In a batch process of manufacturing anhydrous alcohol from aqueous alcohol, the step of forming a batch mixture of aqueous alcohol and a liquid substance capable of forming an azeotropic ternary mixture of minimum boiling point with alcohol and water, the said substance being present in an amount not exceeding that required to form said ternary mixture, and distilling said mixture to separate an azeotropic ternary mixture of alcohol, water and said substance therefrom, condensing said azeotropic ternary mixture and allowing it to separate into two layers, distilling the layer richer in third substance to remove the water therefrom, and returning the remainder of said layer to said first named mixture as the distillation thereof proceeds.

7. A batch process of manufacturing anhydrous alcohol from aqueous alcohol which comprises forming a mixture of aqueous alcohol and benzene, the benzene being present in an amount not exceeding 9.5 times the weight of the water present, distilling said mixture to separate an azeotropic ternary mixture of alcohol, water and benzene therefrom, condensing said ternary mixture and allowing it to separate into two layers, and returning the layer richer in benzene to said first named mixture as the distillation thereof proceeds until substantially all the water is removed therefrom.

8. A batch process of manufacturing anhydrous alcohol from aqueous alcohol which comprises forming a batch mixture of aqueous alcohol and benzene, the benzene being present in an amount equal to 3.5 to 5 times the weight of the water present, distilling said mixture to separate an azeotropic ternary mixture of alcohol, water, and benzene therefrom, condensing said azeotropic ternary mixture and allowing it to separate into layers, and returning the layer richer in benzene to said first named mixture as the distillation thereof proceeds until substantially all the water is removed therefrom.

9. A batch process of manufacturing anhydrous alcohol from aqueous alcohol which from aqueous alcohol comprises forming a mixture of aqueous alcohol and benzene, the benzene being present in an amount not exceeding 9.5 times the weight of the water present, distilling said mixture to separate an azeotropic ternary mixture of alcohol, water, and benzene therefrom, condensing said azeotropic ternary mixture and allowing it to separate into layers, returning the layer richer in benzene to said first named mixture as the distillation thereof proceeds until substantially all the water is removed therefrom, and distilling a binary mixture of benzene and alcohol from said first named mixture to remove all traces of benzene after the water has been removed.

10. A batch process of manufacturing anhydrous alcohol which comprises forming a batch mixture of aqueous alcohol and benzene, the benzene being present in an amount not exceeding 9.5 times the weight of the water present, distilling said mixture to separate an azeotropic ternary mixture of alcohol, water and benzene therefrom, condensing said azeotropic ternary mixture and allowing it to separate into two layers, returning the layer richer in benzene to said first named mixture as the distillation thereof proceeds until substantially all the water is removed therefrom, distilling a binary mixture of benzene and alcohol from said first named mixture to remove all traces of benzene after the water has been removed, and further distilling said first named mixture to remove anhydrous alcohol therefrom and condensing the anhydrous alcohol.

11. A batch process of manufacturing anhydrous alcohol from aqueous alcohol which comprises forming a mixture of aqueous alcohol and benzene, the benzene being present in an amount not exceeding 9.5 times the weight of the water present, distilling the said mixture to separate an azeotropic ternary mixture of alcohol, water and benzene therefrom, condensing said azeotropic ternary mixture and allowing it to separate into two layers, distilling the layer richer in benzene to remove the water therefrom, and returning the remainder of said layer to said first named mixture as the distillation thereof proceeds.

12. A batch process of manufacturing anhydrous alcohol from aqueous alcohol which comprises forming a batch mixture of aqueous alcohol and benzene, the benzene being present in an amount equal to 3.5 times the weight of the water present, distilling the said mixture to separate an azeotropic ternary mixture of alcohol, water and benzene therefrom, condensing said ternary mixture and allowing it to separate into two layers, distilling the layer richer in benzene to remove the water therefrom, and returning the said layer to said first named mixture as the distillation thereof proceeds.

13. A batch process for manufacturing anhydrous alcohol from aqueous alcohol, which comprises forming a batch mixture of aqueous alcohol and benzene, the ratio of the benzene to water in the said batch being approximately 4 to 1, distilling from said batch an azeotropic mixture of alcohol, benzene, and water, allowing spontaneous separation of the condensate into two layers, and supplying the layer thereof richer in benzene to the residue of said batch while continuing distillation of the ternary mixture until substantially all of the water is removed from the batch and an alcohol containing residue is left, the amount of benzene present, in the material being distilled, being limited to the benzene in said batch as an upper limit.

14. A batch process for manufacturing anhydrous alcohol from aqueous alcohol, which comprises forming a batch mixture of aqueous alcohol and benzene, the ratio of the benzene to water in the said batch being approximately 4 to 1, distilling from said batch an azeotropic mixture of alcohol, benzene, and water, allowing spontaneous separation of the condensate into two layers, supplying the layer thereof richer in benzene to the residue of said batch while continuing the distillation of the ternary mixture until substantially all of the water is removed from the batch and an alcohol containing residue is left, the amount of benzene present, in the material being distilled, being limited to the benzene in said batch as an upper limit, and distilling a binary mixture of benzene and alcohol from said first named mixture to remove all traces of benzene after the water has been removed.

15. A batch process for manufacturing anhydrous alcohol from aqueous alcohol, which comprises forming a batch mixture of aqueous alcohol and benzene, the ratio of the benzene to water in the said batch being approximately 4 to 1, distilling from said batch an azeotropic mixture of alcohol, benzene, and water, and returning benzene from the distillate to the residue of said batch while continuing the distillation of the ternary mixture until substantially all of the water is removed from the batch and an alcohol-containing residue is left, the amount of benzene present, in the material being distilled, being limited to the benzene in said batch as an upper limit.

16. In a batch process of manufacturing anhydrous alcohol from aqueous alcohol the step of forming a mixture of aqueous alcohol and benzene, the benzene being present in an amount not exceeding 9.5 times the weight of water present, distilling the said mixture to separate an azeotropic ternary mixture of alcohol, water and benzene therefrom, and maintaining sufficient benzene in the batch mixture during the distillation to completely dehydrate the alcohol.

In testimony whereof I affix my signature.

RUSSELL B. CROWELL.